United States Patent
Khoroshev

(10) Patent No.: US 7,961,445 B2
(45) Date of Patent: Jun. 14, 2011

(54) METHOD OF DETECTING FAULT EXTINCTION DURING A THREE-PHASE AUTORECLOSING CYCLE IN AN AC TRANSMISSION LINE

(76) Inventor: Mark I. Khoroshev, Arcadia, CA (US)

(*) Notice: Subject to any disclaimer, the term of this patent is extended or adjusted under 35 U.S.C. 154(b) by 952 days.

(21) Appl. No.: 11/880,165

(22) Filed: Jul. 19, 2007

(65) Prior Publication Data

US 2008/0030912 A1    Feb. 7, 2008

Related U.S. Application Data

(60) Provisional application No. 60/831,564, filed on Jul. 19, 2006.

(51) Int. Cl.
*H02H 3/00* (2006.01)
(52) U.S. Cl. ............................................. 361/59
(58) Field of Classification Search .................. 361/59
See application file for complete search history.

(56) References Cited

U.S. PATENT DOCUMENTS

| | | | | | |
|---|---|---|---|---|---|
| 3,529,174 | A | * | 9/1970 | Smith | 307/43 |
| 4,398,255 | A | * | 8/1983 | Premerlani | 700/294 |
| 4,506,210 | A | * | 3/1985 | Chase | 324/66 |
| 4,649,821 | A | * | 3/1987 | Marshall et al. | 102/206 |
| 5,402,072 | A | * | 3/1995 | Chiang et al. | 324/537 |
| 2002/0186106 | A1 | * | 12/2002 | Miller | 333/247 |
| 2004/0027747 | A1 | * | 2/2004 | Kim et al. | 361/59 |

* cited by examiner

*Primary Examiner* — Jared J Fureman
*Assistant Examiner* — Nicholas Ieva
(74) *Attorney, Agent, or Firm* — Mintz, Levin, Cohn, Ferris, Glovsky and Popeo, P.C.

(57) ABSTRACT

A new method for three-phase reclosing of transmission lines is disclosed. According this method, after the type of fault is identified and the faulted line is opened for all three phases from both ends, fault extinction is recognized by comparison of amplitudes and angles of voltages induced at opened phases with predetermined settings. The transmission line is reclosed after the fault is found to be extinguished.

20 Claims, 3 Drawing Sheets

METHOD OF DETECTING FAULT EXTINCTION DURING A THREE-PHASE AUTORECLOSING CYCLE IN AN AC TRANSMISSION LINE

CROSS-REFERENCE TO RELATED APPLICATIONS

This application claims priority to U.S. Provisional Patent Application No. 60/831,564, filed Jul. 19, 2006, which is incorporated by reference.

TECHNICAL FIELD

This invention relates generally to electric power distribution system operation and specifically to recovery from faults in such a system.

BACKGROUND

A method is known for three-phase autoreclosing of a transmission line after a short circuit at the line is cleared by the three phases opening from both ends, as discussed for example in P. Kundur, *Power System Stability and Control* (McGraw-Hill, Inc. 1994). The line is closed in all three phases from both ends after a pre-selected time interval. This time interval is chosen to guarantee that the secondary arc will self-extinguish. This method's disadvantage is lack of reliable information about the status of the opened faulted line and overly high probability of closing into a still-existing fault.

A method is known for single-phase autoreclosing at a transmission line, where for single phase to ground faults, the affected phase is identified and opened from both sides. Then amplitude of the induced voltage at the open phase is measured. If this amplitude exceeds a pre-selected value, the secondary arc is considered self extinguished and the opened phase is closed. This method is discussed in Soviet Union Inventor's Certificate No. 1,092,642 to Il' in et al., published May 15, 1984. This method's disadvantages are difficulties with detection of self extinguishing of the secondary arc for transmission lines which are heavily loaded, long, and not compensated.

A method is known for the single phase autoreclosing of a non-compensated transmission line where after the faulted is detected, the faulted phase is disconnected from both ends of the line. Then the angle between the voltage induced at the open phase and a reference phasor of the transmission line's zero-sequence current is measured. The faulted phase is closed if the angle exceeds the predetermined setting.

This method, like the previous one, does not work for three phase autoreclosing.

A method is known for three phase autoreclosing, where after the type of fault and status of the secondary arc are identified, the line is opened from both sides. Then for two phase faults the healthy phase is closed with the purpose of inducing voltages at the faulted phases. When the secondary arc is self extinguished in at least one of faulted, phases this phase is closed from both ends. The remaining phase's condition is monitored and it is closed after its secondary arc self extinguishes. This method is described in Soviet Union Inventor's Certificate No. 1,042,121 to Basilevich et al., published Sep. 15, 1983.

This method's disadvantage is temporary operation with some phases of the transmission line out of service. It requires special adjustment of zero and negative sequence relay protection and additional delay for autoreclosing. The method is not applicable for three-phase short circuit conditions for sub transmission and distribution lines where circuit breakers typically do not have a single pole operation option.

SUMMARY OF THE INVENTION

A new method for three-phase reclosing of transmission lines is suggested. According this method, after the type of fault is identified and the line is opened for all three phases from both ends, fault extinction is recognized by comparison of amplitudes and angles of voltages induced at opened phases with predetermined settings. The transmission line is reclosed after the fault is found to be extinguished.

FIGURES

FIG. 1 schematically depicts a dual-circuit transmission line.

DETAILED DESCRIPTION OF PREFERRED EMBODIMENTS

Before describing the present invention in detail, it is to be understood that this invention is not limited to specific solvents, materials, or device structures, as such may vary. It is also to be understood that the terminology used herein is for the purpose of describing particular embodiments only, and is not intended to be limiting.

As used in this specification and the appended claims, the singular forms "a," "an," and "the" include both singular and plural referents unless the context clearly dictates otherwise. Thus, for example, reference to "a voltage" includes a plurality of voltages as well as a single voltage, reference to "a fault" includes a plurality of fault as well as single fault, and the like.

Two transmission lines are said to be "parallel" if they are at least approximately parallel for all or part of their length.

A new method for three-phase reclosing of multi-circuit transmission lines is suggested. According this method, after the type of fault is identified and the line is opened for all three phases from both ends, fault extinction is recognized by comparison of amplitudes and angles of voltages induced at opened phases with predetermined settings. The transmission line is reclosed after the fault is found to be extinguished.

Figure 1:
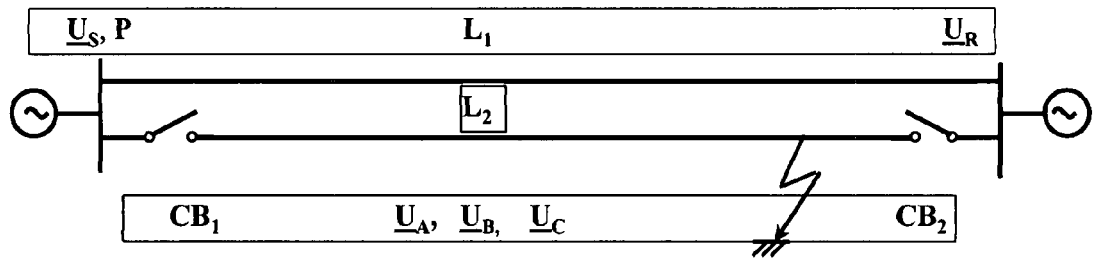

FIG. 1 schematically depicts an exemplary dual-circuit transmission line. After fault origination at the transmission line $L_2$, the line is cleared from both sides by isolating all three phases. Two components of induced voltages appear at the opened phases immediately upon the line's opening.

The first one is the DC component, which originates from not instantaneous opening of circuit breakers' poles and not instantaneous interruption of line's current. If the transmission line is not equipped with shunt compensating devices, this DC component gradually decays due its discharging through a resistive component of the line's insulation.

The second, power frequency component originates from the electrostatic and electromagnetic influence of the healthy line $L_1$. This component exists for both open and closed positions of the line $L_2$. The power frequency component of induced voltage has a typical value around 1-7% of the line's nominal voltage. This value is only slightly influenced by the transmission line's nominal voltage. The slight influence occurs because the induced voltage depends on the line's geometry, and lines of different voltage ratings have somewhat different geometries. The power frequency component of the induced voltage carries the most reliable information about the status of the opened line.

For the electrostatic component of the coupled voltage on an open conductor k of line $L_2$ the following expression can be used:

$$\underline{U}_{k,e} = \underline{U}_A * \frac{b_{Ak} - 0.5(b_{Bk} + b_{Ck}) + j0.866(b_{Bk} - b_{Ck})}{b_k + b_{Ak} + b_{Bk} + b_{Ck}} \quad (1)$$

For an electromagnetic component of coupled voltage, the following expression is applicable:

$$\underline{U}_{k,m} = \underline{I}_A[Z_{Ak} - 0.5*(Z_{Bk}+Z_{Ck}) + j0.866*(Z_{Bk}-Z_{Ck})] \quad (2)$$

Here
$b_{ik} = j\omega C_{ik}$—susceptance between conductors i and k
$b_k = j\omega C_k$—susceptance for wire k
$z_{ik} = R_{ik} + j\omega L_{ik}$—mutual impedance between conductors i and k, per unit length
$Z_{ik} = z_{ik}*l$—total mutual impedance between conductors i and k with length l It should be mentioned that per (1), the electrostatic component of the coupled voltage does not depend on line length and load. This component depends only on the voltages of the healthy line conductors, and the towers' geometry. The electromagnetic component per (2) is a function of conductor length, energized line load, and tower geometry. The structure of (1) and (2) permits use of the equations for any number of energized conductors near an isolated short conductor.

For the transmission line under electrostatic and electromagnetic influence of an other line the said expressions (1) and (2) may be used for calculation of induced voltage for the every opened phase.

For the low value of real power P at the sending end of the healthy line $L_1$, the electromagnetic components of the induced voltages are small. The existence of a fault on line $L_2$ may be determined by comparing the amplitudes of induced voltages with preliminary chosen settings. The values of settings for each phase may be different due the differing placement of the phases of lines $L_1$, $L_2$ with respect to each other.

For longer lines and bigger values of P, the electromagnetic components of the induced voltages (2) may be comparable with the electrostatic components (1). For such conditions it is difficult to determine disappearance of the fault by using amplitudes of induced voltage.

The results of induced voltage calculations for dual-circuit 750 kV, 140 mile long transmission lines are presented at the Table 1. This Table contains amplitudes and angles of induced voltages at open circuit conductors for the various types of non symmetrical faults and for a variety of power angles along the healthy circuit.

The presented data shows that for a considerable range of power angles along unfaulted circuit the induced voltages at conductors of the open circuit for faulted and unfaulted conditions become compatible. For this reason, reliable differentiation of these two conditions by using only amplitudes of induced voltages would be problematic.

Figure 2:
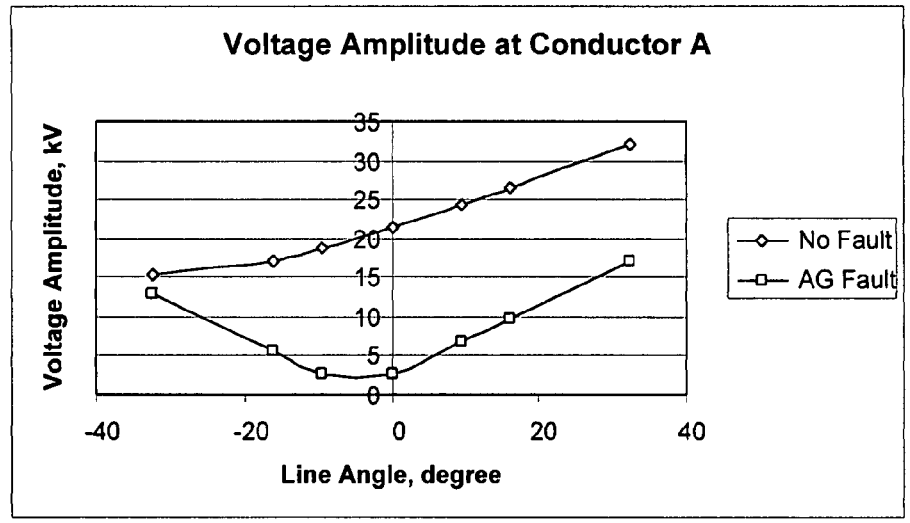
FIG. 2 depicts the amplitude of the induced voltage at faulted conductor A.
Figure 3:
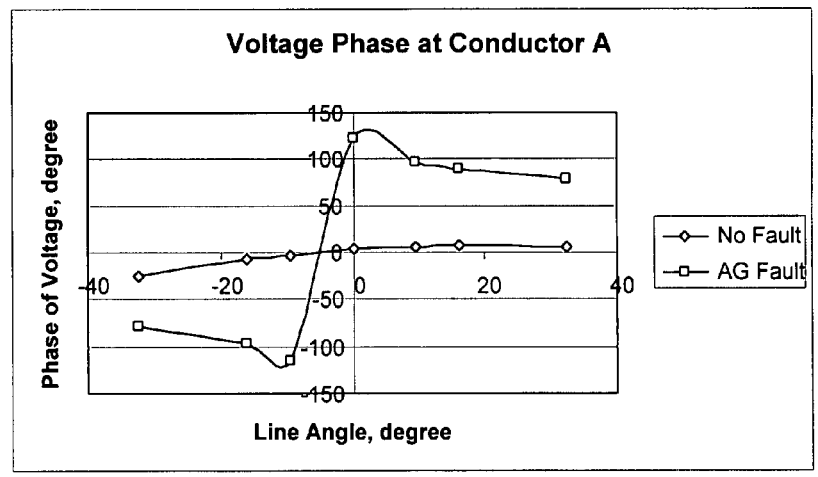
FIG. 3 depicts the angle of the induced voltage at faulted conductor A.

It is possible to improve the accuracy of differentiation by measuring the angle between the phasor of the induced voltage and the reference phasor (the voltage of phase A at the sending substation bus is chosen as the reference phasor in Table 1). FIGS. 2 and 3 present graphs for the modulus and angle of the voltage induced at phase A as a function of the power angle of the healthy phase. They confirm that considering angle as well as magnitude will improve the ability to distinguish faulted and unfaulted conditions. The advantages of using such an approach are greater as the length of the transmission line increases.

Generally speaking, for short lines and for lightly loaded long lines, detection of fault existence may be performed by tracking amplitudes of the induced voltages. For long heavily loaded lines, tracking the angles of the induced voltages is preferred.

TABLE 1

(750 kV line, 140 miles)

| δ Line Angle, ° | Type of Fault | $U_A$ Ampl, kV | $U_A$ Angle, ° | $U_B$ Ampl, kV | $U_B$ Angle, ° | $U_C$ Ampl, kV | $U_C$ Angle, ° |
|---|---|---|---|---|---|---|---|
| 32.4 | no fault | 31.95 | 6 | 20.2 | −83 | 20.5 | 84.7 |
|  | $A_G$ | 17.1 | 78 | 17.6 | −103 | 23.7 | 100 |
|  | $B_G$ | 34.4 | 10.7 | 13.4 | −29 | 23.7 | 81 |
|  | $C_G$ | 28.3 | −3 | 24.7 | −92.5 | 14.5 | −177 |
|  | $AB_G$ | 17.2 | 77.6 | 15.1 | −29 | 25.3 | 94 |
|  | $BC_G$ | 30.5 | 4 | 13.2 | −30 | 14.4 | −177 |
|  | $CA_G$ | 16.9 | 79 | 22.2 | −105 | 14.7 | −178 |
| 16.2 | no fault | 26.45 | 6 | 18 | −101 | 21.67 | 102 |
|  | $A_G$ | 9.8 | 91 | 18.7 | −120 | 24.8 | 114 |
|  | $B_G$ | 29.3 | 13 | 7 | −7 | 24.8 | 83 |
|  | $C_G$ | 26 | −4 | 22.7 | −100 | 6.9 | −175 |
|  | $AB_G$ | 9.8 | 89 | 6.8 | −6.3 | 26.5 | 106 |
|  | $BC_G$ | 27.8 | 4 | 6.7 | −8 | 6.8 | −175 |
|  | $CA_G$ | 8.5 | 90.5 | 22.1 | −113 | 7.1 | −176 |
| 0 | no fault | 21.4 | 2 | 19.5 | −120 | 22.9 | 121 |
|  | $A_G$ | 2.7 | 121 | 22.2 | −132 | 25.7 | 149 |
|  | $B_G$ | 24.2 | 13 | 3.2 | 70 | 26 | 108 |
|  | $C_G$ | 24 | −7 | 22.2 | −107 | 1.5 | 85 |
|  | $AB_G$ | 2.05 | 116 | 3.3 | 75 | 27.3 | 118 |
|  | $BC_G$ | 25.2 | 3 | 3.1 | 71 | 1.6 | 80 |
|  | $CA_G$ | 2.4 | 123 | 23.3. | −120 | 1.6 | 92 |

TABLE 1-continued (750 kV line, 140 miles)

| δ Line Angle, ° | Type of Fault | $U_A$ Ampl, kV | Angle, ° | $U_B$ Ampl, kV | Angle, ° | $U_C$ Ampl, kV | Angle, ° |
|---|---|---|---|---|---|---|---|
| −16.2 | no fault | 17.05 | −7.7 | 24.1 | −131 | 24.1 | 134 |
| | $A_G$ | 5.6 | −96.8 | 27.3 | −136 | 26.4 | 140 |
| | $B_G$ | 19.2 | 8.4 | 8.05 | 137 | 26.9 | 124 |
| | $C_G$ | 22.5 | −12 | 23.2 | −117 | 8.7 | 41 |
| | $AB_G$ | 5.5 | −97 | 8.2 | 138 | 27.7 | 131 |
| | $BC_G$ | 22.8 | −0.3 | 7.9 | 138 | 8.9 | 41 |
| | $CA_G$ | 5.8 | −95 | 25.6 | −126 | 6.6 | 43 |
| −32.4 | no fault | 15.2 | −27 | 30 | −135 | 25.2 | 148 |
| | $A_G$ | 13 | −80 | 32.6 | −13.7 | 26.7 | 154 |
| | $B_G$ | 15.3 | −3 | 14.4 | 151 | 27.4 | 137 |
| | $C_G$ | 22.1 | −18.5 | 25.6 | −124 | 16.2 | 45.4 |
| | $AB_G$ | 12.9 | −73 | 14.5 | 162 | 27.7 | 148 |
| | $BC_G$ | 21.1 | −7.7 | 14.1 | 158 | 16.4 | 45.5 |
| | $CA_G$ | 13.2 | −79 | 28.5 | −129 | 16.6 | 45.6 |

In Table 2 and elsewhere in the application, the notation Arg($\underline{X}\hat{\ }\underline{Y}$) is used to denote the angle between phasors $\underline{X}$ and $\underline{Y}$.

For phase to phase faults an approach relying on voltage angles is also preferred. Table 2 shows the results of simulating such faults for the same 750 kV, 140 mile transmission line described above.

In Table 2:

$\underline{U}_{ref(+)} = \underline{U}_1 - \underline{U}_2$ the reference phasor when the real power direction is from the sending bus $\underline{U}_{ref(-)} = \underline{U}_2 - \underline{U}_1$ the reference phasor when the real power direction is to the sending bus $\underline{U}_1$—phasor of voltage on leading faulted phase $\underline{U}_2$—phasor of voltage on lagging faulted phase

TABLE 2

(750 kV line, 140 miles, Phase to Phase Faults)

| δ (Line Angle, °) | Type of Fault | $U_A$ Ampl, kV | Angle, ° | $U_B$ Ampl, kV | Angle, ° | $U_C$ Ampl, kV | Angle, ° | Arg[($U_{ref(+/-)}$)$\hat{\ }U_3$] Angle, ° (no fault) | Angle, ° (fault) |
|---|---|---|---|---|---|---|---|---|---|
| 32.4 | no fault | 31.95 | 6 | 20.2 | −83 | 20.5 | 84.7 | | |
| | AB | 13.6 | 15 | 28.9 | −43 | 20.5 | 85 | −46 | 24 |
| | BC | 32 | 6 | 15.3 | −10 | 11.1 | 164 | −95 | −19 |
| | CA | 33 | 38 | 20 | −83 | 8.5 | 22.5 | −127 | −53 |
| | ABC | 17 | 78 | 14.5 | −28 | 13 | −177 | | |
| 16.2 | no fault | 26.45 | 6 | 18 | −101 | 21.67 | 102 | | |
| | AB | 8.43 | −15 | 19.4 | −40 | 21.7 | 102 | −90 | 19.5 |
| | BC | 26.5 | 6 | 3.2 | 29 | 10.9 | 170 | −95 | −8 |
| | CA | 22.4 | 50 | 17.9 | −101 | 10.2 | 43.5 | −109 | −24 |
| | ABC | 9.6 | 89 | 6.7 | −7.6 | 7.0 | −176 | | |
| 0(+) | no fault | 21.4 | 2 | 19.5 | −120 | 22.9 | 121 | | |
| | AB | 9.75 | −60 | 10.3 | −47 | 22.9 | 118 | −88 | 92 |
| | BC | 21.4 | 3 | 10 | 167 | 10.5 | 175 | −91 | 59 |
| | CA | 11.8 | 66 | 19.5 | −120 | 12.0 | 69 | −92 | 101 |
| | ABC | 2.45 | 119 | 3.1 | 75 | 1.7 | 87.5 | | |
| 0(−) | no fault | 21.4 | 2 | 19.5 | −120 | 22.9 | 121 | | |
| | AB | 9.75 | −60 | 10.3 | −47 | 22.9 | 118 | 92 | −97 |
| | BC | 21.4 | 3 | 10 | 167 | 10.5 | 175 | 89 | −121 |
| | CA | 11.8 | 66 | 19.5 | −120 | 12.0 | 69 | 88 | −78 |
| | ABC | 2.45 | 119 | 3.1 | 75 | 1.7 | 87.5 | | |
| −16.2 | no fault | 17.05 | −7.7 | 24.1 | −131 | 24.1 | 134 | | |
| | AB | 16 | −7.7 | 5.35 | −122 | 24.1 | 134 | 72 | −15.6 |
| | BC | 17 | −57 | 22.5 | −178 | 9.9 | −179 | 99 | 3 |
| | CA | 3.7 | 151 | 24.1 | −132 | 13.8 | 85 | 100 | 12.7 |
| | ABC | 5.7 | −94 | 8.05 | 139 | 8.7 | 42 | | |
| −32.4 | no fault | 15.2 | −27 | 30 | −135 | 25.2 | 148 | | |
| | AB | 23.3 | −80 | 12.8 | −158 | 25.2 | −147 | 133 | −17.6 |
| | BC | 15.2 | −26 | 34.5 | −171 | 9.1 | −175 | 85 | −16.6 |
| | CA | 12.2 | −132 | 30.1 | −136 | 15.5 | 88.2 | 53 | 26 |
| | ABC | 13.1 | −78 | 14 | 158 | 16 | 45 | | |

For this type of fault the alternative approach, based on measurement of the angle between a reference phasor voltage and the phasor for healthy phase, may be more effective.

As was mentioned before, for the angle-based approach information about direction of real power on the unfaulted circuits of the multi-circuit transmission line is substantial. If power is flowing from the sending bus, the reference phasor $\underline{U}_{ref(+)}$ is formed as the difference of phasors for the leading and the lagging faulted phases' voltages. If power is flowing in the reverse direction, the reference phasor $\underline{U}_{ref(-)}$ is formed as difference of lagging and leading phases.

Figure 4:
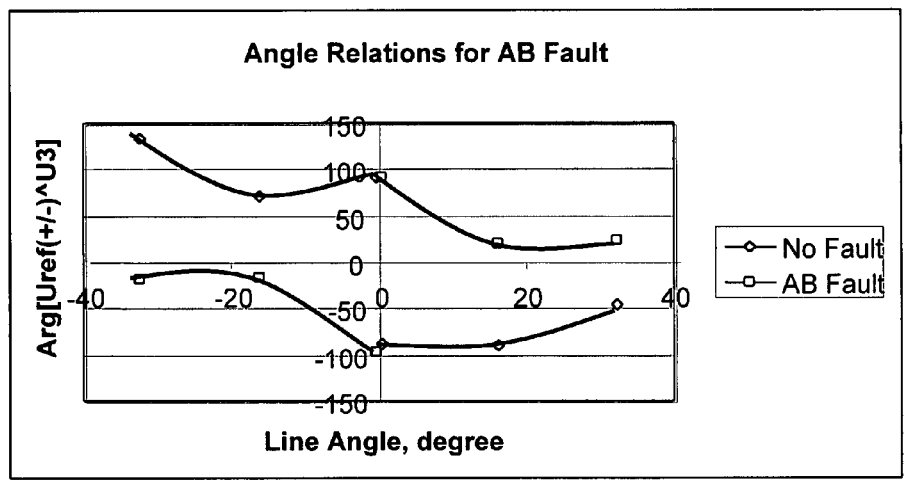
FIG. 4 depicts the angle between the voltage of an unfaulted phase and the reference voltage $U_{ref}$ phasor.

The approach discussed here is illustrated in FIG. 4, which presents graphs of the angle between the reference phasor and the voltage of the unfaulted phase of the open line for faulted and unfaulted conditions.

It is worth mentioning that the angle-based approach of this invention may be also successfully applied for detection of phase-to phase-to-ground faults, for which the amplitude-based approach has been applied.

Figure 5:
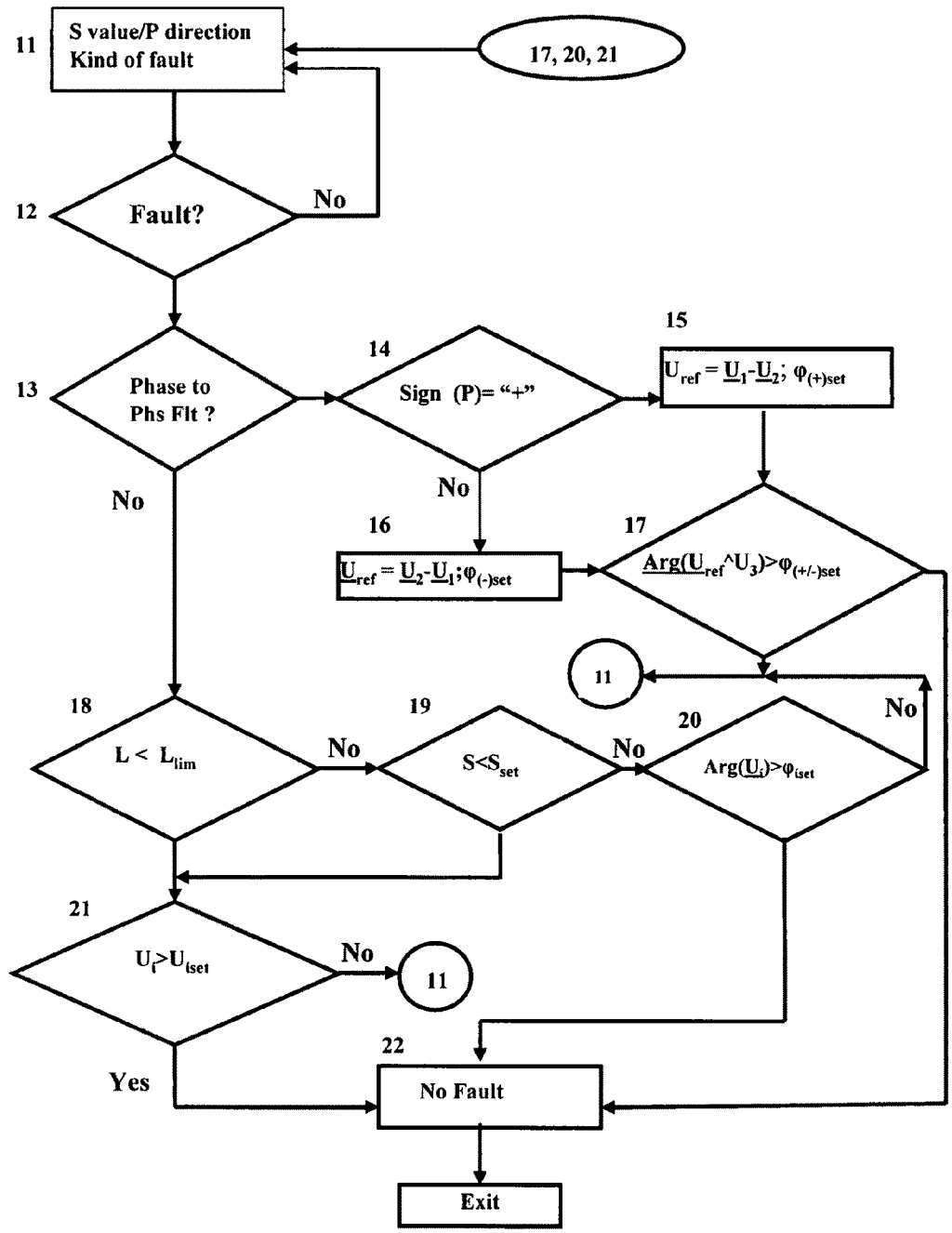
FIG. 5 is a flowchart for a scheme for tracing the presence of a fault at an open transmission circuit subjected to the electromagnetic and electrostatic influence of other transmission circuits.

FIG. 5 presents a flowchart for the execution of a method of the invention. As will be appreciated by those of skill in the art, this method is preferably executed by means of a computer of some sort programmed with suitable software. The computer may, for example, form part of a Supervisory Control and Data Acquisition (SCADA) system. There are, as with any software algorithm, various ways of programming the algorithm which produce the same result, i.e., determination of when the fault has extinguished itself based on moduli and phases of induced voltages.

The flowchart includes block 11, which continuously determines the magnitude and direction of the power flow in the healthy circuits of the multi-circuit transmission line. Flow of control comes into block 11 from blocks 17, 20, and 21, which detect that the fault has extinguished itself. Flow of control out of block 11 is to block 12, which detects a fault occurring at the transmission line.

If block 12 detects the occurrence of a fault, flow of control passes to block 13, which distinguishes "phase to phase only" faults from ones involving ground.

For faults involving ground, the 'No' output of block 13 passes control to block 18. That block compares the transmission line's length with pre-selected value $L_{lim}$. For "phase-to-phase only" faults the 'Yes' output of block 13 passes control to block 14, which determines the direction of real power flow in the healthy circuit.

For short lines, the 'Yes' output of block 18 passes control to block 21, which compares the magnitude of the induced voltages at conductors of the open circuit against pre-selected settings $U_{iset}$. For long lines, the 'No' output of block 18 passes control to block 19, which compares the value of power on the healthy circuit to a pre-selected value $S_{set}$. If the circuit is found by this comparison to be lightly loaded, the 'Yes' output of block 19 passes control to block 21. For the heavy loaded circuit the other output of the block 19 passes control to block 20, which checks the angles of the induced voltages against pre-selected settings $\phi_{iset}$.

When the fault is found to be phase-to-phase only, control is passed to block 14. A reference phasor $U_{ref}$ is created for such faults, as described above following Table 2. Once this phasor is created, the test in block 17 determines whether the fault has been extinguished or not. If it has been, then control passes to block 22.

The following are some additional comments on the algorithm of FIG. 5.

Under normal unfaulted conditions, block 11 performs continuous measurements of full power value and real power direction along the each circuit of the multi-circuit transmission line. The real power flow direction from the sending bus to the line is designated as positive.

During the time interval between initiation of the fault and the opening of the faulted circuit of the transmission line, the type of fault and faulted phases may be determined by already known devices and algorithms.

After the faulted circuit of the transmission line is opened from both sides, block 12 passes control to the portion of the algorithm which serves to evaluate the state of the faulted circuit. As noted above, for "phase-to-phase" faults block 13 transfers control to block 14. Block 14 begins the portion of the algorithm which serves to form the artificial reference phasor as a difference of voltages for the faulted phases of the opened circuit.

If real power along the healthy circuit of the double-circuit transmission line flows from the sending bus, control is transferred to block 15. This block makes settings appropriate for that direction of power flow, as well as a reference phasor, which is equal to difference of the voltages of the leading and lagging faulted phases.

If real power along the healthy circuit of the double-circuit transmission line flows to the sending bus, control is transferred to block 16. This block sets the settings for that direction of power flow, as well as computing the reference phasor $\underline{U}_{ref}$, which is equal to difference of the voltages of the lagging and leading faulted phases.

Blocks 15 and 16 pass control to block 17, where the angle between reference phasor and the phasor of the unfaulted phase is compared with a previously chosen angle setting $\phi_{(+)set}$ or $\phi_{(-)set}$.

If the measured angle value exceeds the angle setting, control is transferred to a block 22. This block 22 signals the extinction of the fault in the opened circuit.

For short circuits that involve ground, block 13 transfers control to block 18. Block 18 chooses an appropriate algorithm for status determination based on the length of the faulted line.

For the long lines signal from the block 18 is transferred to block 19. The block 19 performs comparison of a value of power thru not faulted circuit with predetermined setting. If this value exceeds the setting a control is transferred to the block 20. The block 20 performs comparison of the voltages' arguments at the opened circuit's phases with the predefined angle settings. If these arguments for all phases exceed settings, control is transferred to the block 22, which signals the extinction of the fault at the opened circuit. If the power value is less than power setting $S_{set}$, control is transferred to block 21, where moduli of the voltage induced at the open circuit voltages are compared with the pre-selected voltages $U_{iset}$.

For short lines too, block 18 passes control to block 21. If values of voltage moduli for all phases exceed values of voltage settings $U_{iset}$, control is transferred to block 22, which signals the extinction of the fault at the opened circuit.

In order to achieve better accuracy of the angle-based algorithm, amplitudes of the induced voltages may be required to exceed some minimal values. For some rare circumstances, like close faults or faults on lightly loaded circuits, when this condition is not met, it may be preferable not to employ the angle-based algorithm.

For both modulus and angle-based algorithms, some time delays may be required to avoid influencing relay protection cascade operation and/or to avoid possible reignition after circuit reclosing.

The pre-selected values of the voltages, lengths, powers, and so forth may be determined on the basis of experimentation with actual transmission lines, experimentation at laboratory scale, or on the basis of electromagnetic modeling taking as an input the geometry of the transmission line.

It is to be understood that while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties. However, where a patent, patent application, or publication containing express definitions is incorporated by reference, those express definitions should be understood to apply to the incorporated patent, patent application, or publication in which they are found, and not to the remainder of the text of this application, in particular the claims of this application.

I claim:

1. A method for handling a fault on a three-phase transmission line comprising the steps of:
    detecting that a fault has occurred,
    opening all three phases of the faulted transmission line from both ends,
    determining whether the fault has self-extinguished by using as an input the magnitudes and phases of voltages induced on the transmission line, the voltages induced on the faulted transmission line being induced by one or more parallel transmission lines which are located in the proximity of the faulted transmission line; and
    reclosing the transmission line when it has been determined that the fault has self-extinguished.

2. The method of claim 1, wherein the determining whether the fault has self-extinguished comprises comparing the magnitudes of the induced voltages on all phases of the opened transmission line with pre-selected values.

3. The method of claim 1, wherein the determining whether the fault has self-extinguished comprises determining the angle of a voltage phasor on the faulted transmission line with respect to a phasor from the bus of a sending substation used as a reference phasor and comparing that angle with a pre-selected angle value.

4. The method of claim 3, wherein the angle determination is performed only if power through the one or more parallel transmission lines that generates induced voltages at the faulted line exceeds a predetermined setting.

5. The method of claim 1, wherein the of determining whether the fault has self-extinguished takes into account whether power on the one or more parallel transmission lines flows to or from the sending bus.

6. The method of claim 1, wherein, in the case that (i) the fault involves two phases and not ground and (ii) power on the one or more parallel transmission lines flows from the sending bus, the determining whether the fault has self-extinguished further comprises:
    determining a difference between a phasor of voltage on a leading faulted phase of the opened faulted transmission line and a phasor of voltage on a lagging phase of the faulted transmission line; and
    determining the angle between the difference and a phasor of voltage on an unfaulted phase of the opened faulted transmission line.

7. The method of claim 3, wherein the direction of power flow along the one or more parallel transmission lines is used as an input in choosing the pre-selected angle value from among a pre-selected set of such values.

8. A system for handling a fault on a three-phase transmission line comprising:
    a first circuit or circuits for detecting that a fault has occurred;
    a second circuit or circuits for opening all three phases of the faulted transmission line from both ends;
    a third circuit or circuits for determining whether the fault has self-extinguished by using as an input the magnitudes and phases of voltages induced on the transmission line, the voltages induced on the faulted transmission line being induced by one or more parallel transmission lines which are located in the proximity of the faulted transmission line; and
    a fourth circuit or circuits for closing the transmission line when the third circuit or circuits determine that the fault has self-extinguished.

9. The system of claim 8, wherein the third circuit or circuits for determining whether the fault has self-extinguished comprise a computer processor loaded with appropriate software.

10. The system of claim 8, wherein the third circuit or circuits determines whether the fault has self-extinguished at least by determining the angle of a voltage phasor on the faulted transmission line with respect to a phasor from the bus of a sending substation used as a reference phasor and comparing that angle with a pre-selected angle value.

11. The system of claim 10, wherein the direction of power flow along the one or more parallel transmission lines is used as an input in choosing the pre-selected angle value from among a pre-selected set of such values.

12. The system of claim 8, wherein, in the case that (i) the fault involves two phases and not ground and (ii) power on the one or more parallel transmission lines flows from the sending bus, the third circuit or circuits determines whether the fault has self-extinguished at least by
    determining a difference between a first phasor of voltage on a leading faulted phase of the opened faulted transmission line and a second phasor of voltage on a lagging phase of the faulted transmission line; and
    determining the angle between the difference and a phasor of voltage on an unfaulted phase of the opened transmission line.

13. The system of claim 12, wherein the direction of power flow along the one or more parallel transmission lines is used as an input in choosing the pre-selected angle value from among a pre-selected set of such values.

14. A computer program product stored on a non-transitory computer-readable storage medium, arranged to condition computing apparatus, when installed on that apparatus, to direct the performance of a method comprising:
    detecting that a fault has occurred on a three-phase transmission line,
    opening all three phases of the faulted transmission line from both ends,
    determining whether the fault has self-extinguished by using as an input the magnitudes and phases of voltages induced on the transmission line, the voltages being induced on the transmission line by one or more parallel transmission lines located in the proximity of the faulted transmission line; and
    reclosing the transmission line when it has been determined that the fault has self-extinguished.

15. The method of claim 1, wherein at least one of the detecting that a fault has occurred, the opening of all three phases of the faulted transmission line from both ends, the determining whether the fault has self-extinguished, and the reclosing of the transmission line are performed by a programmable processor.

16. A system comprising:
a non-transitory computer-readable storage medium storing software; and
a programmable processor to execute the software, thereby causing the programmable processor to perform operations comprising:
receiving a first signal from at least one first circuit, the first signal indicating that a fault has occurred on a three-phase transmission line;
causing at least one second circuit to open all three phases of the faulted three-phase transmission line from both ends of the faulted three-phase transmission line;
determining, based on one or more parameters characteristic of one or more voltages induced on the faulted three-phase transmission line by one or more parallel transmission lines located in the proximity of the faulted three-way transmission line, that the fault has self-extinguished, the one or more induced voltage being; and
causing, after the determining that the fault has self-extinguished, the at least one second circuit to close the three-phase transmission line.

17. The system of claim 16, wherein the one or more parameters characteristic of the one or more induced voltages comprise at least one of an amplitude and a phase.

18. The system of claim 16, wherein the determining that the fault has self-extinguished comprises determining the angle of a voltage phasor on the faulted transmission line with respect to a phasor from the bus of a sending substation used as a reference phasor and comparing that angle with a preselected angle value.

19. The system of claim 16, wherein, in the case that (i) the fault involves two phases and not ground and (ii) power on the one or more parallel transmission lines flows from the sending bus, the determining that the fault has self-extinguished comprises:
determining a difference between a first phasor of voltage on a leading faulted phase of the opened faulted transmission line and a second phasor of voltage on a lagging phase of the faulted transmission line; and
determining the angle between the difference and a phasor of voltage on an unfaulted phase of the opened transmission line.

20. The system of claim 18, wherein the angle determination is performed only if power through an unfaulted line that generates induced voltages at the faulted line exceeds a predetermined setting.

* * * * *